United States Patent [19]
Grady

[11] 3,707,977
[45] Jan. 2, 1973

[54] AUTOMOTIVE TENT FRAMEWORK AND COVERING THEREFOR

[76] Inventor: Clarence A. Grady, Route 1, Box 192, Rockaway, Oreg. 97136

[22] Filed: May 6, 1971

[21] Appl. No.: 140,877

[52] U.S. Cl. .................... 135/1 A, 135/4 A, 135/5 A
[51] Int. Cl. ............................. A45f 1/00, A45f 1/16
[58] Field of Search ....... 135/1 A, 3 A, 4 A, 5 A, 7.1; 296/23, 23 C, 23 MC, 26, 27

[56] References Cited

UNITED STATES PATENTS

| | | | |
|---|---|---|---|
| 3,228,405 | 1/1966 | Bursey et al. | 135/1 A |
| 3,231,161 | 1/1966 | Calthorpe | 135/1 A |
| 3,438,670 | 4/1969 | Salmans | 135/1 A |
| 3,463,540 | 8/1969 | Carr | 135/1 A |
| 3,599,651 | 8/1971 | Perry | 135/1 A |

Primary Examiner—Peter M. Caun
Attorney—James D. Givnan, Jr.

[57] ABSTRACT

A tent framework for use in conjunction with a vehicle and including a pair of frame assemblies mounted lengthwise on opposite sides of the vehicle roof structure. Said assemblies being rearwardly extensible to permit pivotally attached leg and crossmembers to be swung outwardly into perpendicular disposed relationship to the main longitudinal member of each frame assembly. Plates affixed to the rearward ends of the main members hingedly attach the leg and crossmembers to the main member with the adjacent ends of the leg and crossmembers in abutting, interlocking relationship. A covering for the framework may be compactly stowed in place on the framework.

7 Claims, 12 Drawing Figures

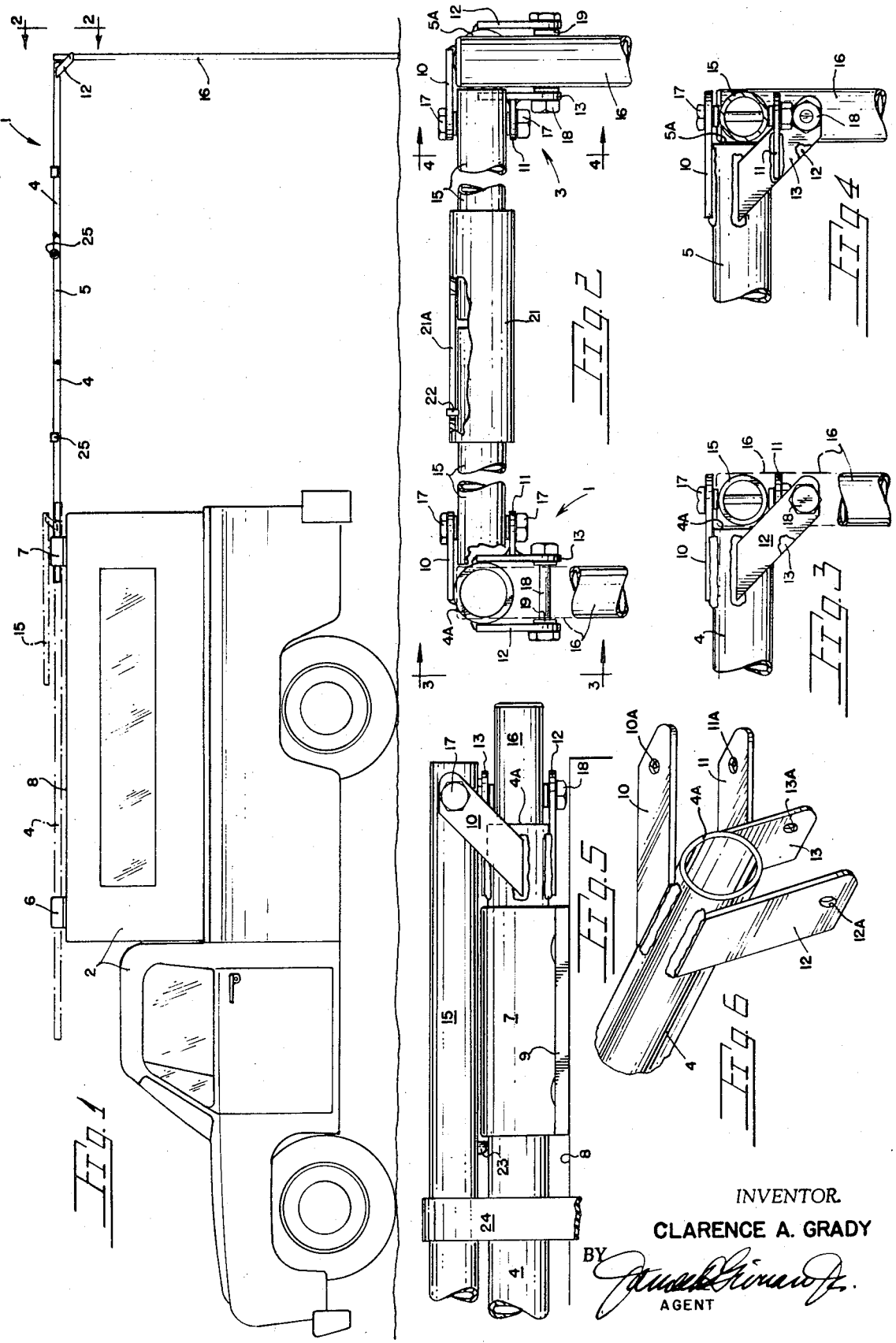

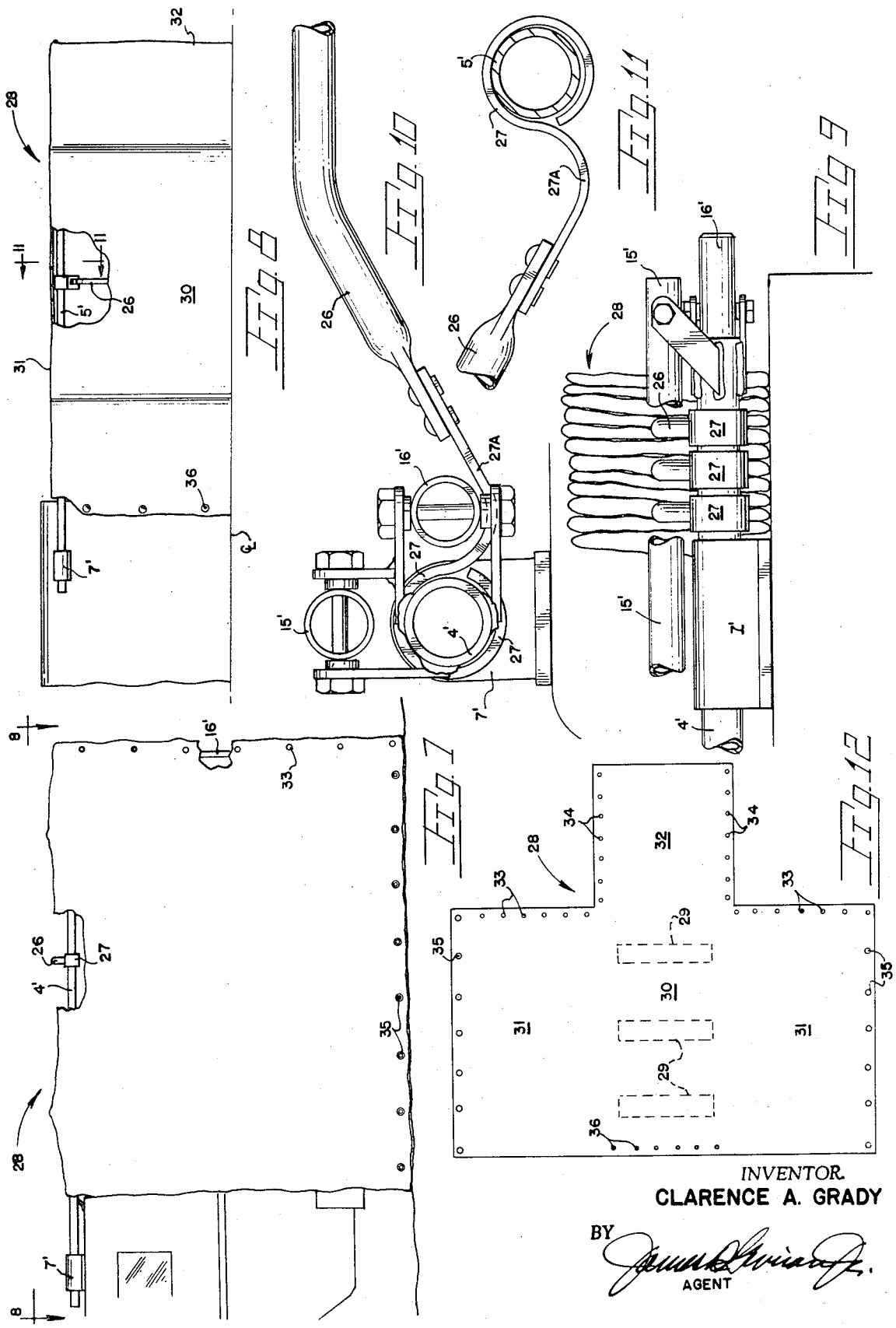

3,707,977

AUTOMOTIVE TENT FRAMEWORK AND COVERING THEREFOR

BACKGROUND OF THE INVENTION

The present invention relates generally to a tent-like structure used in combination with a vehicle and conveniently storable thereon for travel purposes. More particularly, the invention resides in the novel arrangement of tubular members and the manner of interconnecting same facilitating both set up and compact stowing of the framework for travel. A fabric covering is disclosed which may be permanently associated with the framework and likewise readily stowable therewith.

Important requirements for auxiliary shelters or tents used in conjunction with vehicles is that they permit expeditious setting up at the site, provide an adequate area for two or more people and are easily collapsed for stowing aboard the vehicle with no removable fittings susceptible to loss. Further, it is desirable that such shelters when so stowed do not interfere with other roof top carried items such as boats, luggage racks and the like.

A number of prior tent frame arrangements extend laterally from the vehicle and include telescoping members which they find necessary to provide adequate tent area. Such telescoping members and their basic frames are of a complicated costly nature, not easily removed from the vehicle by reason of their weight and when in place on the vehicle obviate the carrying of a roof rack, car top boat, etc.

SUMMARY OF THE INVENTION

The present invention includes two framework assemblies carried in an independent manner lengthwise along the sides of the vehicle roof and which assemblies are extensible rearwardly therefrom. Each assembly includes a main longitudinal member at the rearward end of which is hingedly mounted a leg member and a crossmember component. Upon rearward extension of the two framework assemblies the legs and crossmember of each of conveniently swung through ninety degrees into interlocking, operative disposition. A coupling, carried by one crossmember, slides into engagement with the other crossmember to complete set up of the framework.

It is an important object of the present framework to provide a sizeable auxiliary shelter for a vehicle, which is both easily set up and when so set up provides a rigid framework wherein the associated members brace one another. Crossmembers and leg components are permanently and hingedly attached to one another with no risk of loss and do not require costly and delicate threaded fittings.

The invention further provides a lightweight tubular framework which when stowed in place on the vehicle roof leaves an unobstructed roof span upon which may be carried or mounted the usual accessories or loads. Each of the two side mounted assemblies collapse into compact units located adjacent the roof edge and permitting the passage of tie down straps for other roof carried equipment. When it is desired to remove the present framework from the vehicle the same is readily accomplished. Small sleeves affixed to the vehicle roof carry the frame assemblies at the side of the roof so as not to interfere with other uses of the vehicle roof. If so desired, the sleeves may be removably mounted on the roof.

Important to the instant invention is the novel structure providing for the pivotal mounting of the adjacent ends of a crossmember and leg of each assembly. Said ends, when the crossmember and leg are operatively disposed, move into abutting contact whereby their pivotal movement is limited to the position desired. Further, such contact provides for rigid interlocking of the assembly components.

The invention provides auxiliary living area for use in conjunction with a vehicle with the area provided being large in size compared to that provided by the prior art structures. The large sheltered area so provided by the invention is useful for providing additional living quarters for campers or simply as a windbreak for family outings. The invention, while shown in conjunction with a camper unit, is not restricted to any particular type of vehicle but rather is adaptable with obvious minor modifications to use with most all automobiles and recreational vehicles.

The framework may support a tent-like covering which, for travel purposes, is folded for compact storage intermediate the framework assemblies at the rearward edge of the vehicle roof.

BRIEF DESCRIPTION OF THE DRAWING

With attention to the accompanying drawing:

FIG. 1 is a side elevational view of the automotive tent framework shown operatively disposed in full lines, rearwardly from a recreational vehicle, with a tent-like covering shown in phantom lines, FIG. 2 is an end elevational view of the framework assemblies taken along line 2 — 2 of FIG. 1, FIG. 3 is a side elevational view of an end of a framework assembly taken along line 3 — 3 of FIG. 2, FIG. 4 is a view similar to FIG. 3 taken along line 4 — 4 of FIG. 2 showing the opposite side of a framework assembly end, FIG. 5 is a side elevational view on an enlarged scale showing the end of a framework assembly with its leg and crossmember collapsed for travel alongside the main assembly member, FIG. 6 is a perspective view of the end of a main assembly member with a leg and crossmember removed for illustrative purposes, FIG. 7 is a side elevational view of the present invention with a tent-like covering in place thereon, FIG. 8 is a plan view of FIG. 7 taken along line 8 — 8 thereof showing a portion of the present invention terminating along its longitudinal centerline, FIG. 9 is a side elevational view showing the rearward end of a framework assembly with collapsed leg and crossmember and with a tent-like covering folded on the framework for travel, FIG. 10 is an end elevational view of FIG. 9 taken from the right hand end of FIG. 9 with the tent-like covering removed, FIG. 11 is a sectional view taken along line 11 — 11 of FIG. 8 showing a bow end in place on main assembly member, and FIG. 12 is a plan view of a tent-like covering useable in conjunction with the automotive framework disclosed.

DESCRIPTION OF PREFERRED EMBODIMENTS

With continuing reference to the drawing wherein applied reference numerals indicate parts similarly identified in the following specification, the reference numeral 1 indicates generally a framework assembly extending rearwardly from one side of the roof structure of a vehicle at 2. The framework assembly 1 is shown projecting rearwardly substantially in alignment with the vehicle roof edge. A second and similar framework assembly, indicated generally at 3 in FIG. 2, is disposed in a like manner from the opposite roof edge and combining with the first mentioned assembly to provide a tent framework.

Each assembly includes a main longitudinal frame member at 4 and 5 which, like other frame components, is preferably of lightweight tubing. Pairs of aligned roof mounted collars at 6 and 7 slidably and rotatably receive members 4 and 5 with the fore and aft spacing of said collars and the length of longitudinal members 4 and 5 being somewhat dependent on the length of the vehicle roof at 8. Collars 6 and 7 may include a base portion 9 (FIG. 5) permitting fastened permanent securement to the vehicle roof or alternatively may be secured in a suitable removable manner.

At the rearward end of each of the main frame members 4 and 5 are horizontal (when operatively disposed) plate members 10 and 11 projecting inwardly from their respective main members to receive crossmembers at 15. Each main member additionally carries at its end a pair of depending plates at 12 and 13 which receive the leg members at 16. Plate members 10 and 11 are apertured at 10A, 11A to loosely receive nut and bolt members 17 while the depending plate members 12, 13 are similarly apertured at 12A, 13A to loosely receive nut and bolt members 18. Accordingly, means are thus provided for pivotally mounting the outermost ends of the crossmembers 15 and the upper ends of leg members 16 to the rearward ends of the main members 4 and 5 with pivotal or swinging movement of said crossmembers and leg members being in planes normal to one another about the axes of bolts 17 and 18. Spacers are indicated at 19.

As best shown in FIGS. 2–4 the leg members, when vertically in place, are in end abutment with the ends at 4A and 5A of their respective main members to thus limit the pivotal movement of the former. In a similar manner it is desirable to limit the pivotal movement of the crossmembers 15 by abutting contact of their outer ends with the upper end sidewalls of the leg members 16. Proper dimensioning of the end segments of said members and the locationing of the bolt members 17, 18 (which constitute pivot pins) accomplishes this desired result.

Further, as typically viewed in FIGS. 5 and 6, it will be seen that the pairs of plates extend in an angular manner rearwardly past the ends 4A–5A of their main member 4 or 5. The axes of bolt members 17 and 18 are located to achieve the foregoing objects and further enable collapsing of the crossmembers and leg members against their respective main members 4 and 5 in a parallel manner.

In the embodiment of the invention shown the lower horizontal plate 11 member of each pair attaching a crossmember is carried by the depending plate member 13 as seen in FIG. 4. Securement of the plate members may be by welding or the like or, if desired, the plate members may be in the form of castings with a hollow casting segment being fitted about the rearward end segments of the main framework member 4 or 5.

For interconnecting the aligned, opposed ends of the crossmembers 15 I provide a sleeve 21, carried by one of the crossmembers in a captive manner, for telescoping engagement with the remaining crossmember. The sleeve is slotted at 21A to receive a pin 22 which limits rectilinear movement of the sleeve.

With attention to FIG. 5, whereat a fragment of framework assembly 1 is shown stowed for transport, the rearward end of each main framework member is slid forwardly into position against the collar 7. Preparatory to such stowing the sleeve 21 is disengaged from the other crossmember to permit both of the crossmembers to be swung forwardly into juxtaposition with their respective main frame members. Subsequently each leg member is rotated upwardly into a horizontal inwardly extending position resulting in 90° rotation of its main member 4 or 5 which rotates in its sleeves 6 and 7. Subsequent forward collapsing of the leg member positions the leg member closely alongside its main member 4 or 5 and the previously collapsed crossmember. Forward movement of the main members 4 and 5 results in the stowed configuration as partially seen in FIG. 5 (and shown in broken lines in FIG. 1).

The crossmembers each carry a locking pin at 23 which rides over the collars 7 during forward passage of the main member through the collars 7. Each assembly 1 and 3 may be secured in place by means of a rubber strap 24 (FIG. 5) which encircles the collapsed leg member, crossmember and main framework member of each assembly with the unseen end of the strap being secured by means of a clip attached to the eave of the vehicle roof structure. Accordingly, the securely bundled framework assembly 1 is restrained against linear movement by means of a locking pin 23 on one side of the collar 7 and the plates on the opposite side of the collar.

For purposes of protecting the canvas used as a tent-like framework covering from damage by the ends of the tubular assembly members the ends are preferably dressed off to provide a curved surface. Additionally, if desired, auxiliary canvas supporting bows as at 25 may be inserted in place for resting support between the main framework members 4 and 5 to prevent sagging of the canvas.

In FIGS. 7 through 12 I show a tent-like covering in place on a slightly modified framework structure wherein the removable bows 25 are dispensed with in favor of end mounted bows 26. The latter are retained in slidable attachment with main longitudinal members 4' — 5' by means of circular end members 27. The end supported bows 26 extend crosswise to support a tent-like covering indicated generally at 28 with the bows passing through elongate, open ended pockets 29 (FIG. 12) sewn to the underside of the covering.

The bows 26 and integral end members 27 are slidable on the main tubular members 4' — 5' during setting up of the framework from the collapsed configuration of FIG. 9 wherein the covering 28 is shown stored in a folded condition at the rear of the vehicle.

The covering when extended is slightly longer than the framework with a roof portion at 30, side portions 31 and a rear closure portion 32. Cooperating snap members at 33–34 permit attachment of the side portions to the rear portion of the covering when the same is operatively disposed as in FIG. 7. Grommets at 35 facilitate ground attachment of the side portions. Additional snaps at 36 engage vehicle roof mounted snap members.

The covering 28 with its roof, side and rear portions respectively at 30, 31 and 32 may be stowed by folding, one at a time, the side and rear portions up and over to lie flat on the roof portion 30 of the covering. Since the covering 28 is not attached to the framework other than by the slidable bows 26 the covering may be pushed forwardly to fold same and to locate the bows adjacent the rearmost roof mounted collars 7'. The framework assemblies may then be collapsed to locate crossmembers 15' and leg members 16' alongside their respective main frame members 4' and 5'. Upon such collapsing of each framework assembly they are subsequently slid forwardly with rearward end of each assembly being in a stowed configuration as seen typically in FIG. 9. With reference to FIG. 10 it will be seen that the collapsed leg member 16' will slide forwardly over a downwardly curved portion 27A of the member 27 which, as above noted, has previously been slid forwardly adjacent collar 7'.

The tent-like covering 28 with its superimposed folded portions 30, 31, 32 will fold to the shape seen in FIG. 9. The framework assemblies are then secured for travel as in the first described form of the invention.

Setting up of the framework with its covering 28 merely requires the rearward extension of the two side mounted framework assemblies with rotation of each through ninety degrees to locate the leg members 16' vertically and the crossmembers 15' horizontally. The bows 26 with their integral end members 27 are slid rearwardly from their positions of FIG. 9 to flatten out the covering 28 whereupon the side and rear closure portions 31-32 are unfolded and draped over the framework members. Subsequent coupling of the snaps 33, 34 and 36 provides an enclosure open at the vehicle end for passage between the vehicle and the enclosure.

While I have shown but a few embodiments of the invention it will be apparent to those skilled in the art that the invention may be embodied still otherwise without departing from the spirit and scope of the invention.

Having thus described the invention what is desired to be secured under a Letters Patent is:

I claim:
1. A tent framework useable in conjunction with a vehicle with the framework being carried in a stowed position on the vehicle roof and extensible rearwardly therefrom for operative disposition of the framework, said framework comprising,
    a pair of framework assemblies each including,
       a main longitudinal member,
       a positionable leg member carried at the rearward end of said main member and contactable with the ground surface.
       a positionable crossmember also carried at the rearward end of said main member,
       means carried by said main member pivotally attaching one end of said leg member and said crossmember to the rearward end of the main member for arcuate swinging movement of the leg and crossmembers from a collapsed position alongside said main member to an operative position perpendicular thereto,
    collar means affixed to the vehicle roof slidably and rotatably receiving each of said main longitudinal members, and
    said main members being rotatable subsequent to collapsing of said leg member and said cross member to raise both of same about the axis of said main member to permit forward sliding movement of the main member into place immediately above the roof surface of the vehicle.

2. A tent framework as claimed in claim 1 wherein said pivotally attaching means comprises pairs of plates and pivot means extending through said plates and the attached ends of said leg member and said crossmember, said leg member and said crossmember when swung to an operative position perpendicular to the main member being restricted against further swinging movement by abutting contact of their adjacent ends.

3. A tent framework as claimed in claim 2 wherein said pairs of plates extend outwardly and rearwardly from the end of the main member to offset said pivot means rearwardly from the end of the main member whereby at least one of the swingably positionable members will contact the end of said main member to limit the formers movement.

4. A tent framework as claimed in claim 1 wherein a locking pin is carried by one of said positionable members whereby when said positionable member is collapsed against the main member the locking pin is contactable with the roof mounted collar to prevent rearward sliding movement of the main member and hence the framework assembly of which it is a part.

5. A tent framework as claimed in claim 1 wherein the crossmembers carried by each of the main members are positionable into axial alignment, coupling means slidably carried by one of said crossmembers for limited axial movement thereon for engagement with the other of said crossmembers to retain the crossmembers in alignment when in operative disposition.

6. A tent framework as claimed in claim 1 additionally including,
    bows extending crosswise intermediate the framework assemblies and slidably supported at their ends by the main longitudinal member of each framework assembly,
    a tent-like covering supported by said framework and having roof, side and rear closure portions, and
    said side and rear closure portions being foldable for storing into superimposed relationship with said roof portion with said covering when folded being supported entirely by said slidably mounted bows whereby upon forward sliding of the bows will fold the tent-like covering into a compact area preparatory to travel of the vehicle.

7. The tent framework as claimed in claim 6 wherein said tent-like covering has a series of crosswise orientated pockets formed on its roof portion to receive said bows therewithin in a permanent manner.

* * * * *